(12) United States Patent
Wurst et al.

(10) Patent No.: US 11,111,970 B1
(45) Date of Patent: Sep. 7, 2021

(54) CLUTCH BALANCE DAM WITH COOLING FLOW VALVE

(71) Applicant: Schaeffler Technologies AG & Co. KG, Herzogenaurach (DE)

(72) Inventors: Nicholas Wurst, Akron, OH (US); Edward Goodwill, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/952,676

(22) Filed: Nov. 19, 2020

(51) Int. Cl.
*F16D 25/0638* (2006.01)
*F16D 25/12* (2006.01)
*F16D 13/72* (2006.01)
*F16D 48/02* (2006.01)

(52) U.S. Cl.
CPC ......... *F16D 25/0638* (2013.01); *F16D 13/72* (2013.01); *F16D 25/123* (2013.01); *F16D 48/02* (2013.01); *F16D 2048/029* (2013.01)

(58) Field of Classification Search
CPC ............................. F16D 25/0638; F16D 13/52
See application file for complete search history.

(56) References Cited

U.S. PATENT DOCUMENTS

| 6,705,447 | B2 | 3/2004 | Gorman et al. |
| 8,839,923 | B2 | 9/2014 | Greathouse et al. |

*Primary Examiner* — Stacey A Fluhart
(74) *Attorney, Agent, or Firm* — Kevin L. Parks

(57) ABSTRACT

A clutch assembly includes a shaft, a backing plate fixed to the shaft, a plurality of clutch plates, a hydraulic piston, and a balance dam. The hydraulic piston is sealed to the shaft and axially slidable on the shaft to clamp the plurality of clutch plates against the backing plate to close the clutch assembly. The balance dam is fixed to the shaft and disposed axially between the backing plate and the hydraulic piston. The balance dam has a cooling flow orifice and a cooling flow valve for adjusting cooling oil flow through the cooling flow orifice. In some example embodiments, the cooling flow valve is a reed valve with a displaceable steel plate fixed to the balance dam and preloaded against the balance dam to cover the cooling flow orifice.

20 Claims, 2 Drawing Sheets

CLUTCH BALANCE DAM WITH COOLING FLOW VALVE

TECHNICAL FIELD

The present disclosure relates generally to a clutch balance dam, and more specifically to a clutch balance dam with a cooling flow valve.

BACKGROUND

Hydraulically-operated clutch pistons with check valves are known. One example is shown and described in U.S. Pat. No. 6,705,447 titled PISTON FOR HYDRAULICALLY-OPERATED CLUTCH to Gorman et al., hereby incorporated by reference as if set forth fully herein.

SUMMARY

Example embodiments broadly comprise a clutch assembly including a shaft, a backing plate fixed to the shaft, a plurality of clutch plates, a hydraulic piston, and a balance dam. The hydraulic piston is sealed to the shaft and axially slidable on the shaft to clamp the plurality of clutch plates against the backing plate to close the clutch assembly. The balance dam is fixed to the shaft and disposed axially between the backing plate and the hydraulic piston. The balance dam has a cooling flow orifice and a cooling flow valve for adjusting cooling oil flow through the cooling flow orifice. In some example embodiments, the cooling flow valve is a reed valve with a displaceable steel plate fixed to the balance dam and preloaded against the balance dam to cover the cooling flow orifice.

In some example embodiments, the displaceable steel plate includes a bonded seal or a seal coating on an end that covers the cooling flow orifice. In an example embodiment, the displaceable steel plate is flat and a thickness of the bonded seal or the seal coating provides a preload of the displaceable steel plate against the balance dam. In some example embodiments, the displaceable steel plate is fixed to the balance dam by a rivet. In an example embodiment, the rivet is offset from the cooling flow orifice in a circumferential direction.

In some example embodiments, the hydraulic piston and the balance dam are sealed together to form a first portion of a balance chamber. In an example embodiment, the cooling flow valve is preloaded against the balance dam with a force such that the cooling flow valve seals the cooling flow orifice when a fluid pressure in the balance chamber is about 0.3 bar. In some example embodiments, the hydraulic piston and the balance dam are both sealed to the shaft and the shaft forms a second portion of the balance chamber. In some example embodiments, the shaft has a radial channel for introducing a fluid into the balance chamber. In an example embodiment, the shaft includes an axial channel hydraulically connected to the radial channel.

In some example embodiments, the cooling flow valve is arranged to prevent an outward flow of cooling oil from the balance chamber when the shaft is stationary, and the cooling flow valve is arranged to permit an outward flow cooling oil flow from the balance chamber when the shaft is rotating. In an example embodiment, the cooling flow valve is displaced away from the balance dam by a dynamic pressure in the balance chamber when the shaft is rotating, thereby permitting cooling flow out of the balance chamber. In an example embodiment, the cooling flow valve is displaced away from the balance dam by hydraulic pressure in the balance chamber when the hydraulic piston is displaced towards the balance dam, thereby permitting cooling flow out of the balance chamber.

In an example embodiment, the clutch assembly includes a clutch plate carrier disposed axially between the backing plate and the balance dam, fixed to the backing plate, and including an orifice for allowing a radially flowing cooling oil flow to cool the plurality of clutch plates. In some example embodiments, the clutch assembly includes a resilient element disposed axially between the hydraulic piston and the balance dam urging the hydraulic piston away from the balance dam. In some example embodiments, the resilient element includes a plurality of coil springs. In an example embodiment, the plurality of coil springs is disposed about a circumference arranged radially outside of the cooling flow orifice.

In some example embodiments, the clutch assembly has a seal plate. The seal plate and the hydraulic piston are sealed together to form a first portion of a pressure chamber. In an example embodiment, the seal plate and the hydraulic piston are both sealed to the shaft and the shaft forms a second portion of the pressure chamber.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
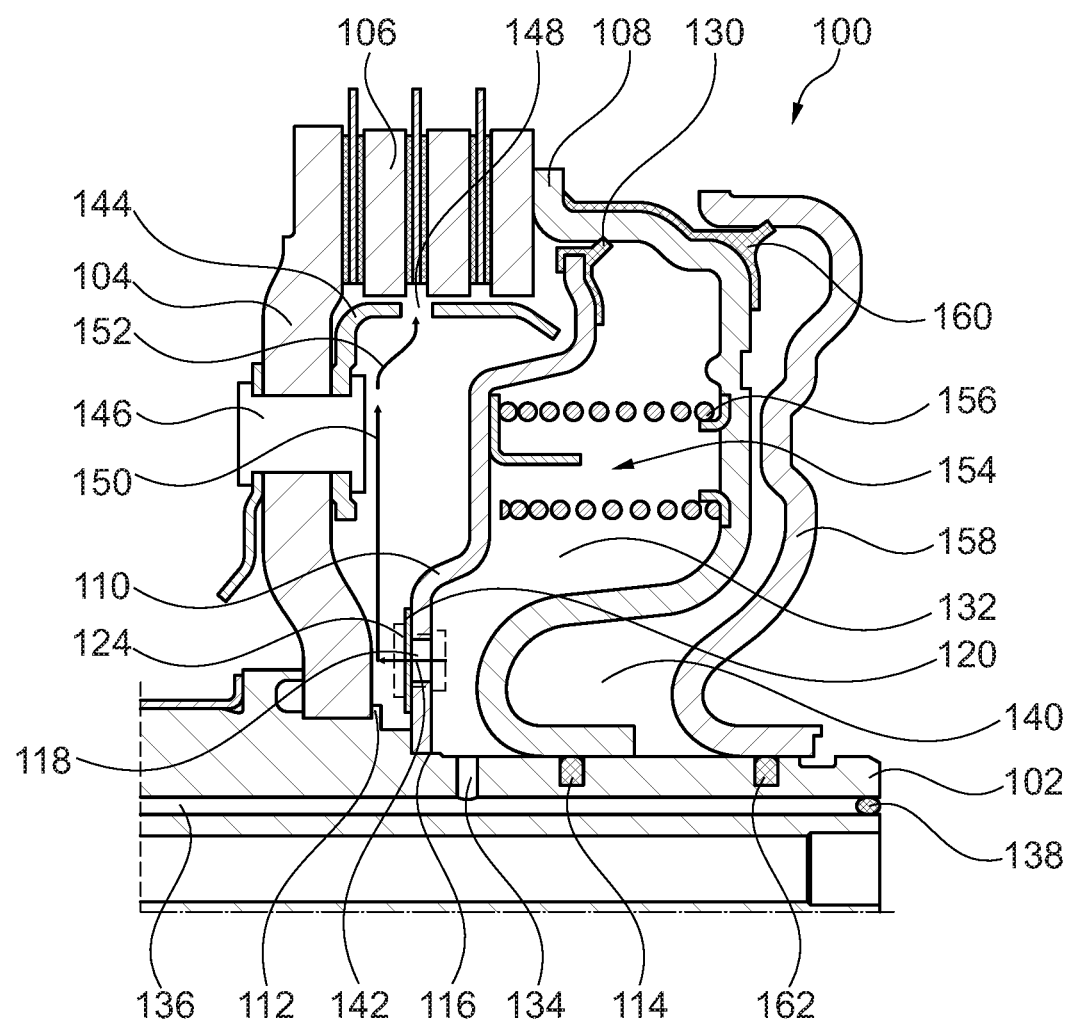
FIG. 1 illustrates a cross-sectional view of a clutch assembly according to an example aspect of the present disclosure.
Figure 2:
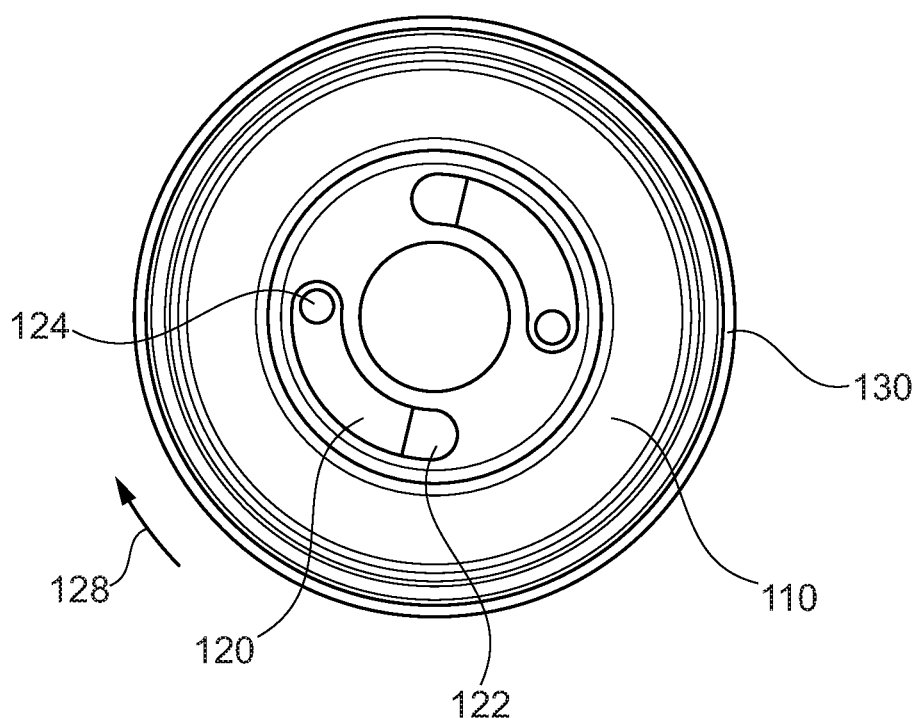
FIG. 2 illustrates a front view of a balance dam for the clutch assembly of FIG. 1.
Figure 3:
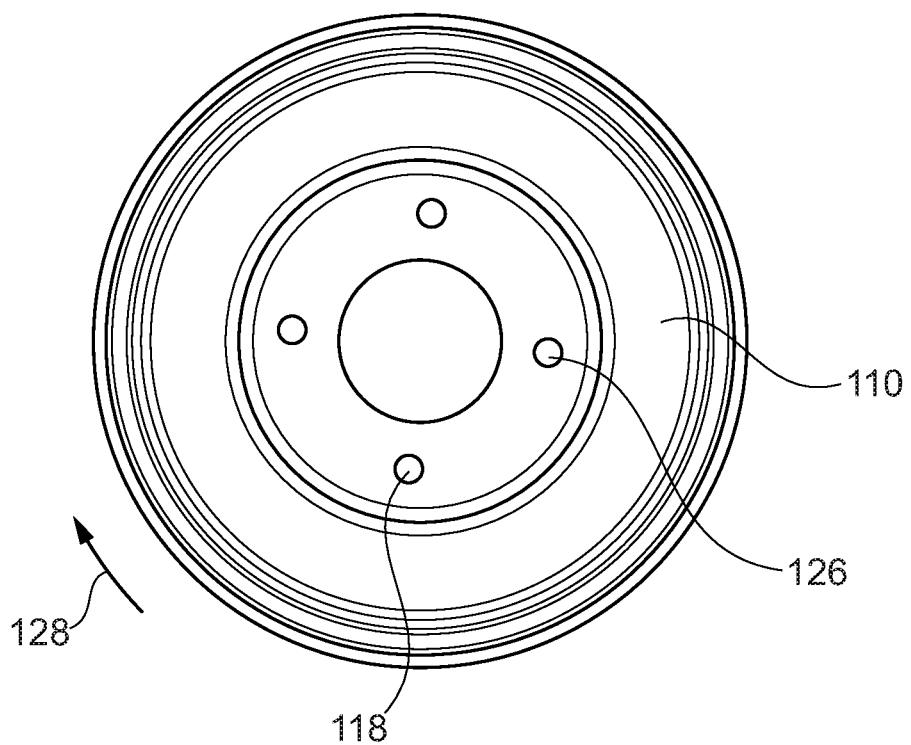
FIG. 3 illustrates a front view of the balance dam of FIG. 2 shown without a cooling flow valve.

The following description is made with reference to FIGS. 1-3. FIG. 1 illustrates a cross-sectional view of clutch assembly 100 according to an example aspect of the present disclosure. FIG. 2 illustrates a front view of balance dam 102 for the clutch assembly of FIG. 1. FIG. 3 illustrates a back view of the balance dam of FIG. 2.

Clutch assembly 100 includes shaft 102, backing plate 104, clutch plates 106, hydraulic piston 108 and balance dam 110. The backing plate is fixed to the shaft by staking 112, for example. The hydraulic piston is sealed to the shaft by seal 114 and axially slidable on the shaft to clamp the plurality of clutch plates against the backing plate to close the clutch assembly. The balance dam is fixed to the shaft by staking 116, for example, and disposed axially between the backing plate and the hydraulic piston. The balance dam includes cooling flow orifice 118 and cooling flow valve 120 for adjusting cooling oil flow through the cooling flow orifice as described below. The cooling flow valve is disposed on a side of the balance dam facing the backing plate.

Cooling flow valve 120 is a reed valve with a displaceable steel plate fixed to the balance dam and preloaded against the balance dam to cover the cooling flow orifice. The displaceable steel plate includes bonded seal or seal coating 122 on an end that covers the cooling flow orifice. In the embodiment shown, the displaceable steel plate is flat and a thickness of the bonded seal or the seal coating provides a preload of the displaceable steel plate against the balance dam. That is, before being assembled to the balance dam, the steel plate is not formed but, once the plate is pressed tight against the balance dam, the bonded seal or seal coating displaces an end portion of the steel plate away from the balance dam by a thickness of the bonded seal or seal coating to preload the steel plate against the balance dam. The displaceable steel plate is fixed to the balance dam by rivet 124 installed in rivet hole 126, for example. As can be seen in FIGS. 2 and 3, for example, the the rivet is offset from the cooling flow orifice in circumferential direction 128.

Hydraulic piston 108 and balance dam 110 are sealed together at bonded seal 130 to form a first portion balance chamber 132. The cooling flow valve is preloaded against the balance dam with a force such that the cooling flow valve seals the cooling flow orifice when a fluid pressure in the balance chamber is about 0.3 bar. In other words, the preload force is about the same as a force from a pressure of about 0.3 bar acting on an area the size of the cooling flow orifice. So, for an orifice size of 1 mm diameter, the preload force of the cooling flow valve would be about:

$$0.3\,bar * \frac{\pi(1\text{ mm})^2}{4} = 0.03 MPa * \frac{\pi}{4}\text{ mm}^2 \approx 23.56\text{ mN}.$$

Hydraulic piston 108 and balance dam 110 are sealed to shaft 102 at staking 116 and seal 114, respectively, and the shaft forms portion of balance chamber 132. Shaft 102 includes radial channel 134 for introducing a fluid into the balance chamber, and axial channel 136 hydraulically connected to the radial channel and sealed by pressed-in ball 138. Channel 136 is connected to a flow channel in a housing (not shown) for introducing a cooling flow into the balance chamber to hydraulically balance piston 108 and provide a cooling flow for clutch plates 106 as described in more detail below. By hydraulically balancing the piston, we mean that balance chamber 132 and pressure chamber 140 disposed on opposite sides of piston 108 are both filled with oil so that any dynamic pressure effects from rotation of the piston, balance dam, shaft, etc. are the compensated, improving controllability of the piston during clutch engagement events.

The cooling flow valve is arranged to prevent an outward flow of cooling oil from the balance chamber when the shaft is stationary, the cooling flow valve is arranged to permit an outward flow cooling oil flow (shown by arrow 142) from the balance chamber when the shaft is rotating. That is, so long as a pressure of a cooling flow from channel 134 is about 0.3 bar, or less, the cooling flow valve stays closed and fluid is the balance chamber is maintained. But once the shaft (and piston, balance chamber, etc.) is rotating, dynamic pressure adds to the static pressure of the cooling flow, increasing the pressure above 0.3 bar and the valve opens to permit cooling flow to the clutch plates 106. In other words, the cooling flow valve is displaced away from the balance dam by a dynamic pressure in the balance chamber when the shaft is rotating, thereby permitting cooling flow out of the balance chamber.

In addition, during a clutch engagement rather for example, the cooling flow valve may be displaced away from the balance dam by hydraulic pressure in the balance chamber when the hydraulic piston is displaced towards the balance dam, thereby permitting cooling flow out of the balance chamber. That is, when the piston is displaced towards the clutch plates to close the clutch, a volume of the balance chamber is decreased increasing a pressure of oil in the balance chamber, and the resulting pressure increase exceeds the 0.3 bar nominal pressure to open the cooling flow valve. It should be noted that, although 0.3 bar pressure is used as an example, other static pressures of oil in balance chamber 132 are possible and would yield similar results if the cooling flow valve were designed accordingly.

Clutch assembly 100 also includes clutch plate carrier 144 disposed axially between the backing plate and the balance dam and fixed to the backing plate by rivet 146. Carrier 144 includes orifice 148 for allowing a radially flowing cooling oil flow indicated by arrows 150 and 152 to cool the plurality of clutch plates.

Clutch assembly 100 includes resilient element 154 disposed axially between the hydraulic piston and the balance dam urging the hydraulic piston away from the balance dam. In the example embodiment shown, resilient element 154 includes coil springs 156 disposed about a circumference arranged radially outside of the cooling flow orifice. Although coil springs are shown, other resilient elements are possible. For example, element 154 may include a Belleville washer or a rubber puck.

Clutch assembly 100 includes seal plate 158. The seal plate and hydraulic piston 108 are sealed together at seal 160 to form a portion of pressure chamber 132. Hydraulic pressure in the pressure chamber is increased to move the piston towards clutch plates 106, pressing the clutch plates against backing plate 104 to engage (or close) the clutch. Shaft 102 includes a channel (not shown) in fluid communication with pressure chamber 132 that adjusts a pressure in the pressure chamber. The seal plate and the hydraulic piston are both sealed to the shaft at seals 162 and 114, respectively, and the shaft forms a portion of the pressure chamber.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

- 100 Clutch assembly
- 102 Shaft
- 104 Backing plate
- 106 Clutch plates
- 108 Hydraulic piston
- 110 Balance dam
- 112 Staking (backing plate to shaft)
- 114 Seal (shaft to hydraulic piston)
- 116 Staking (balance dam to shaft)
- 118 Cooling flow orifice
- 120 Cooling flow valve
- 122 Bonded seal or seal coating
- 124 Rivet (flow valve to balance dam)
- 126 Rivet hole
- 128 Circumferential direction
- 130 Bonded seal (balance dam to hydraulic piston)
- 132 Balance chamber
- 134 Radial channel
- 136 Axial channel
- 138 Pressed-in ball
- 140 Pressure chamber
- 142 Cooling flow arrow
- 144 Clutch plate carrier
- 146 Rivet (carrier to backing plate)
- 148 Orifice (carrier)
- 150 Cooling flow arrow
- 152 Cooling flow arrow
- 154 Resilient element
- 156 Coil springs
- 158 Seal plate
- 160 Seal (hydraulic piston to seal plate)
- 162 Seal (shaft to seal plate)

What is claimed is:

1. A clutch assembly, comprising:
    a shaft;
    a backing plate fixed to the shaft;
    a plurality of clutch plates;
    a hydraulic piston, sealed to the shaft and axially slidable on the shaft to clamp the plurality of clutch plates against the backing plate to close the clutch assembly; and
    a balance dam:
        fixed to the shaft;
        disposed axially between the backing plate and the hydraulic piston; and
        comprising:
            a cooling flow orifice; and
            a cooling flow valve for adjusting cooling oil flow through the cooling flow orifice.

2. The clutch assembly of claim 1 wherein the cooling flow valve is a reed valve comprising a displaceable steel plate fixed to the balance dam and preloaded against the balance dam to cover the cooling flow orifice.

3. The clutch assembly of claim 2 wherein the displaceable steel plate comprises a bonded seal or a seal coating on an end that covers the cooling flow orifice.

4. The clutch assembly of claim 3 wherein the displaceable steel plate is flat and a thickness of the bonded seal or the seal coating provides a preload of the displaceable steel plate against the balance dam.

5. The clutch assembly of claim 2 wherein the displaceable steel plate is fixed to the balance dam by a rivet.

6. The clutch assembly of claim 5 wherein the rivet is offset from the cooling flow orifice in a circumferential direction.

7. The clutch assembly of claim 1 wherein the hydraulic piston and the balance dam are sealed together to form a first portion of a balance chamber.

8. The clutch assembly of claim 7 wherein the cooling flow valve is preloaded against the balance dam with a force such that the cooling flow valve seals the cooling flow orifice when a fluid pressure in the balance chamber is 0.3 bar.

9. The clutch assembly of claim 7 wherein the hydraulic piston and the balance dam are both sealed to the shaft and the shaft forms a second portion of the balance chamber.

10. The clutch assembly of claim 9 wherein the shaft comprises a radial channel for introducing a fluid into the balance chamber.

11. The clutch assembly of claim 10 wherein the shaft comprises an axial channel hydraulically connected to the radial channel.

12. The clutch assembly of claim 7 wherein:
    the cooling flow valve is arranged to prevent an outward flow of cooling oil from the balance chamber when the shaft is stationary; and
    the cooling flow valve is arranged to permit an outward flow cooling oil flow from the balance chamber when the shaft is rotating.

13. The clutch assembly of claim 12 wherein the cooling flow valve is displaced away from the balance dam by a dynamic pressure in the balance chamber when the shaft is rotating, thereby permitting cooling flow out of the balance chamber.

14. The clutch assembly of claim 12 wherein the cooling flow valve is displaced away from the balance dam by hydraulic pressure in the balance chamber when the hydraulic piston is displaced towards the balance dam, thereby permitting cooling flow out of the balance chamber.

15. The clutch assembly of claim 1 further comprising a clutch plate carrier:
    disposed axially between the backing plate and the balance dam;
    fixed to the backing plate; and
    comprising an orifice for allowing a radially flowing cooling oil flow to cool the plurality of clutch plates.

16. The clutch assembly of claim 1 further comprising a resilient element disposed axially between the hydraulic piston and the balance dam urging the hydraulic piston away from the balance dam.

17. The clutch assembly of claim 16 wherein the resilient element comprises a plurality of coil springs.

18. The clutch assembly of claim 17 wherein the plurality of coil springs is disposed about a circumference arranged radially outside of the cooling flow orifice.

19. The clutch assembly of claim 1 further comprising a seal plate, wherein the seal plate and the hydraulic piston are sealed together to form a first portion of a pressure chamber.

20. The clutch assembly of claim 19 wherein the seal plate and the hydraulic piston are both sealed to the shaft and the shaft forms a second portion of the pressure chamber.

\* \* \* \* \*